United States Patent [19]

Tateno

[11] Patent Number: 4,738,110

[45] Date of Patent: Apr. 19, 1988

[54] DIESEL ENGINE EQUIPPED WITH A MECHANICALLY DRIVEN CHARGER

[75] Inventor: Hidenori Tateno, Aichi, Japan

[73] Assignee: Toyota Jidosha Kabushiki Kaisha, Aichi, Japan

[21] Appl. No.: 30,347

[22] Filed: Mar. 26, 1987

[30] Foreign Application Priority Data

Mar. 29, 1986 [JP] Japan ................... 61-69772

[51] Int. Cl.⁴ ........................................... F02B 33/44
[52] U.S. Cl. ...................... 60/610; 60/609; 123/559.1; 123/562
[58] Field of Search ............ 60/609, 610, 612; 123/559, 562, 564

[56] References Cited

U.S. PATENT DOCUMENTS 3,143,849  8/1964  Glamann ............ 60/612 X
3,712,280  1/1973  Brille et al. ............ 60/609
4,539,948  9/1985  Toepel ............ 123/564 X

FOREIGN PATENT DOCUMENTS 59-67537  5/1984  Japan .

Primary Examiner—Stephen F. Husar
Attorney, Agent, or Firm—Parkhurst & Oliff

[57] ABSTRACT

A diesel engine comprising an intake passage in which a turbocharger and a mechanically driven charger are arranged. A bypass passage bypassing the mechanically driven charger is provided, and a bypass valve is arranged in the bypass passage. When the engine is started, the mechanically driven charger is operated and the bypass valve is closed. When the engine is operating under a partial load after completion of the warm-up of the engine, the operation of the mechanically driven charger is stopped and the bypass valve is opened.

28 Claims, 13 Drawing Sheets

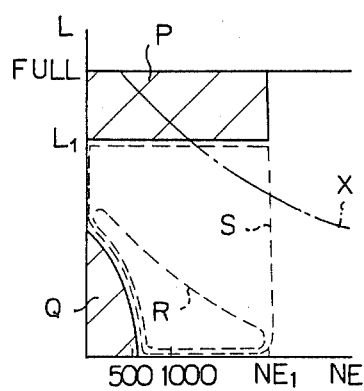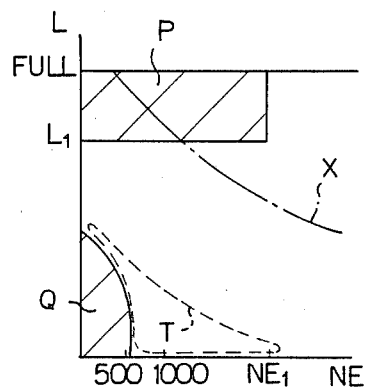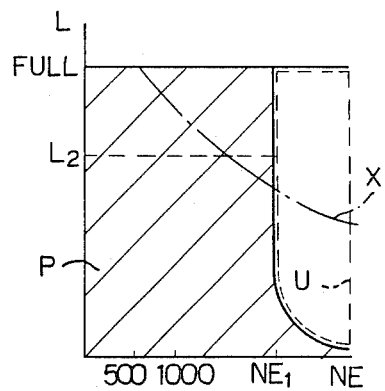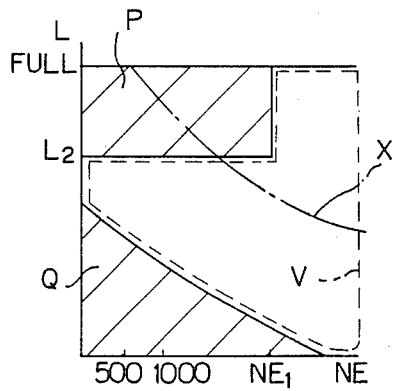

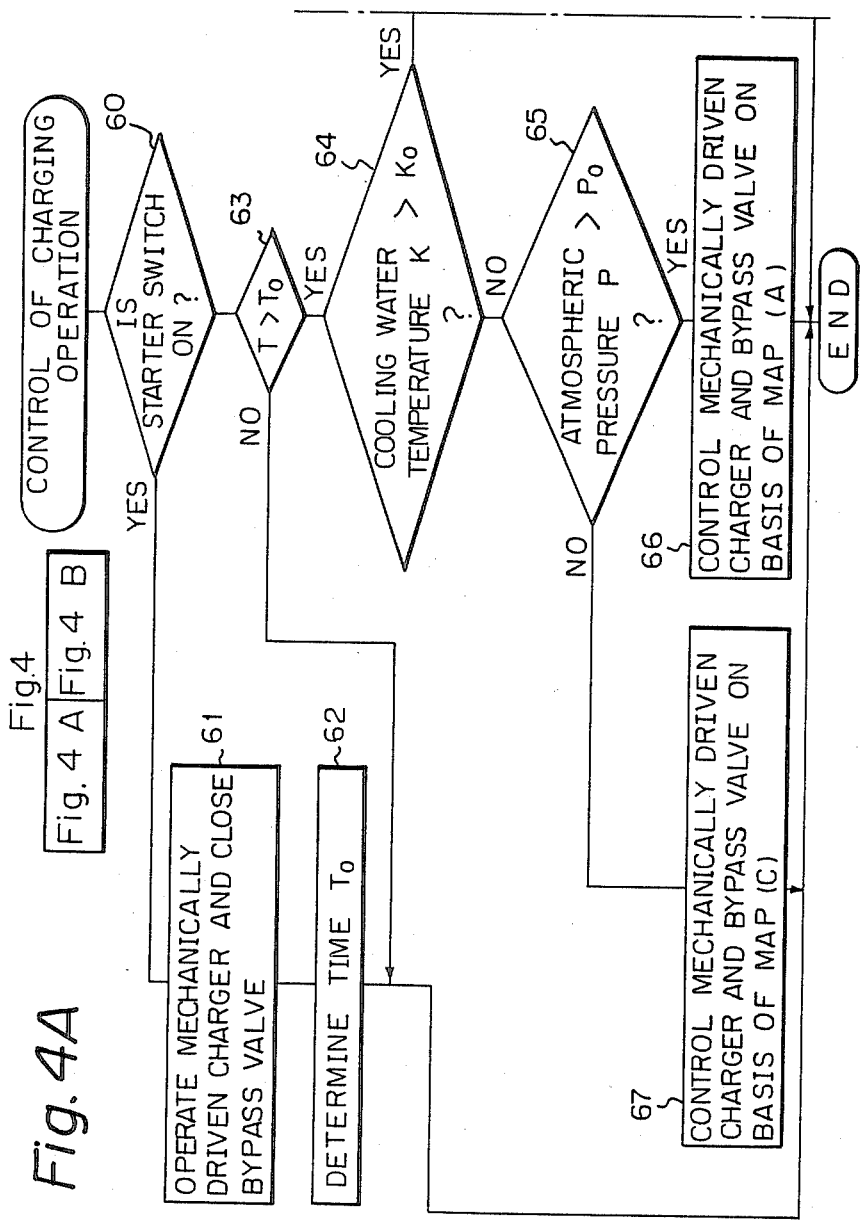

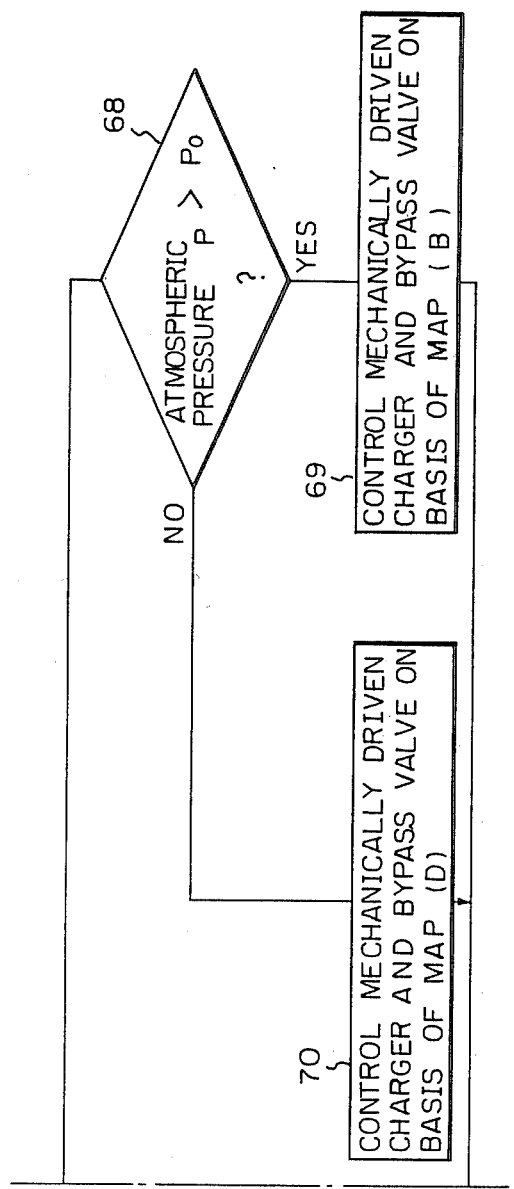

DIESEL ENGINE EQUIPPED WITH A MECHANICALLY DRIVEN CHARGER

BACKGROUND OF THE INVENTION

1. Field of the Invention

The present invention relates to a diesel engine equipped with a mechanically driven charger.

2. Description of the Related Art

Two of the great advantages of diesel engines are that, one, the cost of fuel used for diesel engines is cheaper than that of gasoline, in some countries such as Japan, and two, that the fuel consumption of diesel engines is lower than that of gasoline engines. Consequently, in an effort to enhance the advantages of diesel engines, attempts have been made to reduce the fuel consumption as much as possible. In a diesel engine having a swirl chamber or a prechamber, the fuel consumption and the output power after completion of the warm-up are changed in accordance with the geometrical compression ratio $\epsilon$ (hereinafter referred to as compression ratio) as illustrated in FIG. 6, and in such a diesel engine, the lowest fuel consumption can be obtained when the compression ratio $\epsilon$ is about 16:1 through 18:1. Consequently, in such a diesel engine, preferably the combustion chamber has a compression ratio $\epsilon$ of about 16:1 through 18:1.

However, in this diesel engine, when the piston is close to the top dead center of the compression stroke, if the temperature of air under pressure in the combustion chamber does not increase beyond the ignition temperature of fuel injected from a fuel injector, it is impossible to ignite and burn the fuel. In a diesel engine having the compression ratio of about 16:1 through 18:1, the temperature of air in the combustion chamber increases beyond the ignition temperature of the fuel after the engine is warmed-up. However, in a particular engine operating state such as a cold start of the engine, the temperature of air in the combustion chamber does not increase beyond the ignition temperature of the fuel, and thus it is impossible to operate the engine. In addition, when the amount of fuel injected from the fuel injector is small, and thus the heat produced in the combustion chamber is small, such as during idling or in an extremely low load operating state, although the temperature of air in the combustion chamber may increase beyond the ignition temperature of the fuel, the increase in the temperature of the fuel is insufficient, causing an incomplete combustion, misfiring, and the production of white smoke. Furthermore, when the engine is operated under a low atmospheric pressure, for example, at a high altitude, the range of the engine operating state in which the temperature of air in the combustion chamber does not increase beyond the ignition temperature of the fuel, is widened. Therefore, in a conventional diesel engine, the engine normally has a compression ratio of about 20:1 through 23:1, so that the temperature of air in the combustion chamber can increase beyond the ignition temperature of the fuel even when a cold start is carried out or when the engine is operated at a high altitude. However, if the engine has a compression ratio of about 20:1 through 23:1, the fuel consumption after warm-up increases, as illustrated in FIG. 6, eliminating one of the great advantages of the diesel engine.

In order to increase the output power of an engine, a diesel equipped with a turbocharger is known. However, since the turbocharger is operated by the energy of the exhaust gas, when the engine is operating at a low speed or under a light load, the rotating speed of the turbocharger can not be sufficiently increased due to a lack of energy of the exhaust gas, and thus a turbocharging operation is not sufficiently carried out. Consequently, even if the diesel engine is equipped with a turbocharger, if the engine has a compression ratio of about 16:1 through 18:1, the temperature of air in the combustion chamber can not increase beyond the ignition temperature of the fuel at the time of cold start of the engine. Consequently, in a diesel engine equipped with a turbocharger, the engine engine must have a compression ratio of about 20:1 through 23:1.

In addition, another diesel engine equipped with a charger mechanically driven by the engine is known. In this diesel engine, since the charger is driven when the engine is started, the temperature of air in the combustion chamber is increased at the start of the engine because of the additional charged air to the engine. Consequently, in this diesel engine, even if the engine has a compression ratio of about 16:1 through 18:1, the temperature of air in the combustion chamber increases beyond the ignition temperature of the fuel. Therefore, in this engine, since it is possible for the engine to have a compression ratio of 16:1 through 18:1, it is possible to improve the fuel consumption. However, in this engine, the charger is continuously driven by the engine, and thus the charging operation is carried out when the engine is operating under a middle load in which the charging operation is not necessary. Consequently, when the engine is operating under a middle load, the compressing force to be exerted by the piston increases, and at the same time, a loss of output power of the engine occurs due to the necessity for driving the charger. Therefore, in this diesel engine, a problem occurs in that the fuel consumption is increased.

A further diesel engine is known in which the turbocharger and the mechanically driven charger are arranged in series in the intake passage of the engine. In this engine, a bypass passage bypassing the mechanically driven charger is provided (Japanese Unexamined Utility Model Publication No. 59-67537). When the rotating speed of the engine is higher than a predetermined speed, the operation of the mechanically driven charger is stopped, and when the rotating speed of the engine is lower than a predetermined speed, the mechanically driven charger is operated. In this diesel engine, when the engine is operating at a low speed at which the turbocharger does not work, since the charging operation is carried out by the mechanically driven charger, it is possible to increase the output power of the engine even when the engine is operating at a low speed. In addition, when the rotating speed of the engine increases, since the operation of the mechanically driven charger is stopped, it is possible to improve the fuel consumption.

In this engine, the mechanically driven charger is operated when the engine is operating at a low speed as mentioned above, and the object of this is to improve the output power of the engine when the engine is operating at a low speed. Therefore, even if the mechanically driven charger is controlled so that it is operated when the engine is operating at a low speed, it is unclear whether or not the mechanically driven charger is operating at the time of cranking of the engine, that is, at a start of the engine, at which the engine does not produce output power. In this engine, if the mechanically drive charger is not operated when the engine is started, it is impossible to lower the compression ratio, and therefore, it is impossible to obtain a good fuel consumption.

SUMMARY OF THE INVENTION

An object of the present invention is to provide a diesel engine capable of lowering the compression ratio.

According to the present invention, there is provided a diesel engine comprising: a turbocharger driven by an exhaust gas of the engine; an intake passage; a mechanically driven charger arranged in the intake passage and mechanically driven by the engine; connection control means for controlling the mechanical connection between the mechanically driven charger and the engine; a bypass passage connected to the intake passage downstream of the mechanically driven charger; valve means controlling a bypass air flow within the bypass passage; first detecting means for detecting a starting operation of the engine; second detecting means for detecting an operating state of the engine; and control means for controlling the connection control means and the valve means in response to output signals from the first detecting means and the second detecting means to connect the mechanically driven charger to the engine and shut off the bypass air flow when the engine is started or when the engine is operated in a predetermined first operating state, and to disconnect the mechanically driven charger from the engine and allow the bypass air flow when the engine is operating in a predetermined second operating state.

The present invention may be more fully understood from the description of preferred embodiments of the invention set forth below, together with the accompanying drawings.

BRIEF DESCRIPTION OF THE DRAWINGS

In the drawings:

FIGS. 3A-D are diagrams illustrating the operation of the mechanically driven charger and the bypass valve of the first embodiment;

FIGS. 4A-B are a flow chart for carrying out the control of the charging operation;

DESCRIPTION OF THE PREFERRED EMBODIMENTS

Figure 1:
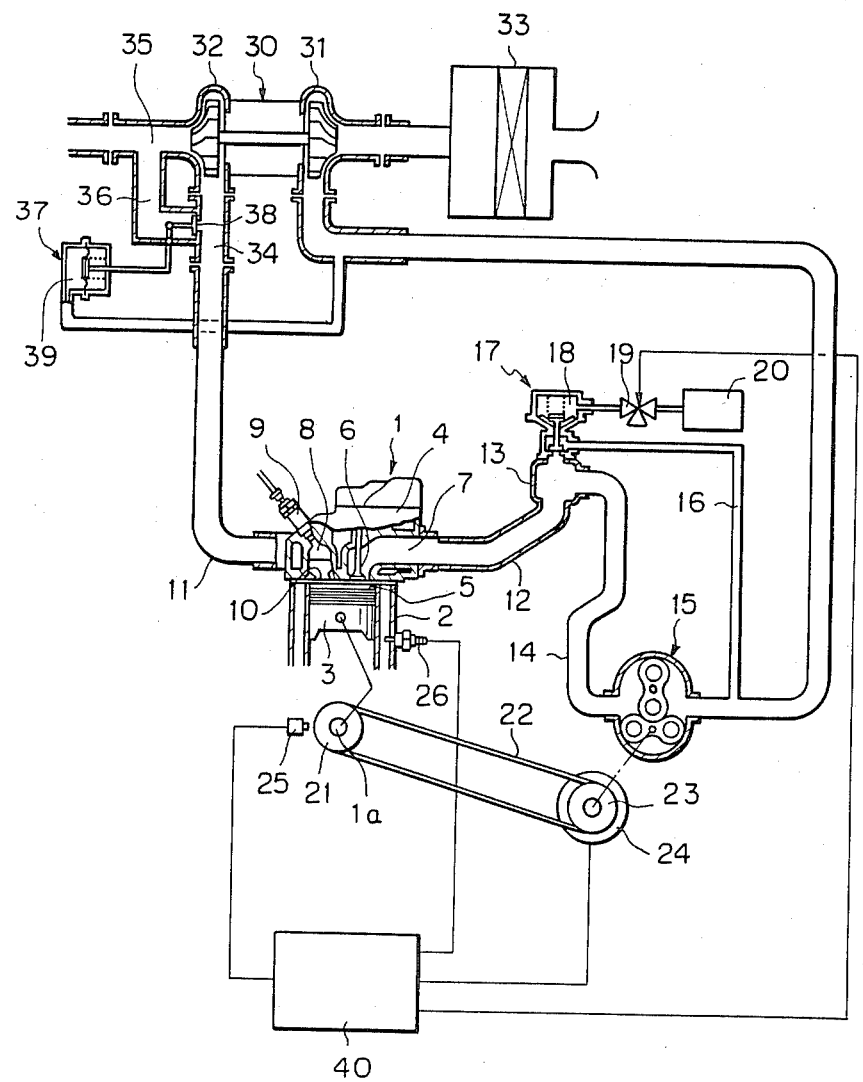
FIG. 1 is a schematically illustrated view of a first embodiment of a diesel engine according to the present invention.

Referring to FIG. 1, reference numeral 1 designates a diesel engine, 2 a cylinder block, 3 a piston reciprocally movable in the cylinder block 2, and 4 a cylinder head; 5 designates a combustion chamber formed between the piston 3 and the cylinder head 4, 6 an intake valve, 7 an intake port, and 8 a swirl chamber; 9 designates a fuel injector arranged in the swirl chamber 8, and 10 a bore interconnecting the swirl chamber 8 to the combustion chamber 5. In the embodiment illustrated in FIG. 1, the compression ratio of the diesel engine 1 is lower than that of ordinary diesel engines. That is, the diesel engine 1 has a compression ratio of, for example, about 16:1 through 18:1. This compression ratio is the same for all other embodiments of this invention. The present invention can be also applied to a diesel engine which does not have a swirl chamber or a prechamber, and in such an engine, the engine normally has a compression ratio of about 16:1 through 18:1. However, if the present invention is applied to such an engine, the engine is given a compression ratio of about 12:1 through 14:1.

An exhaust valve (not shown) is arranged on the cylinder head 4, and the combustion chamber 5 is connected to an exhaust manifold 11 via the exhaust valve. The intake port 7 is connected to a common surge tank 13 via a branch pipe 12, and the surge tank 13 is connected to a turbocharger 30 via an intake duct 14. A mechanically driven charger 15 is arranged in the intake duct 14. A bypass passage 16 is branched from the intake duct 14 upstream of the mechanically driven charger 15 and is connected to the surge tank 13. A bypass valve 17 is arranged in the bypass passage 16. The bypass valve 17 is controlled by a vacuum operated diaphragm apparatus having a vacuum chamber 18, and the vacuum chamber 18 is connected to a vacuum tank 20 via a solenoid valve 19 which can be opened to the outside air. When the vacuum chamber 18 is connected to the vacuum tank 20 by controlling the solenoid valve 19, the bypass valve 19 is opened, and the vacuum chamber 18 is opened to the outside air by controlling the solenoid valve 19 to close the bypass valve 17. The solenoid valve 19 is controlled by an output signal from an electronic control unit 40.

Figure 2:
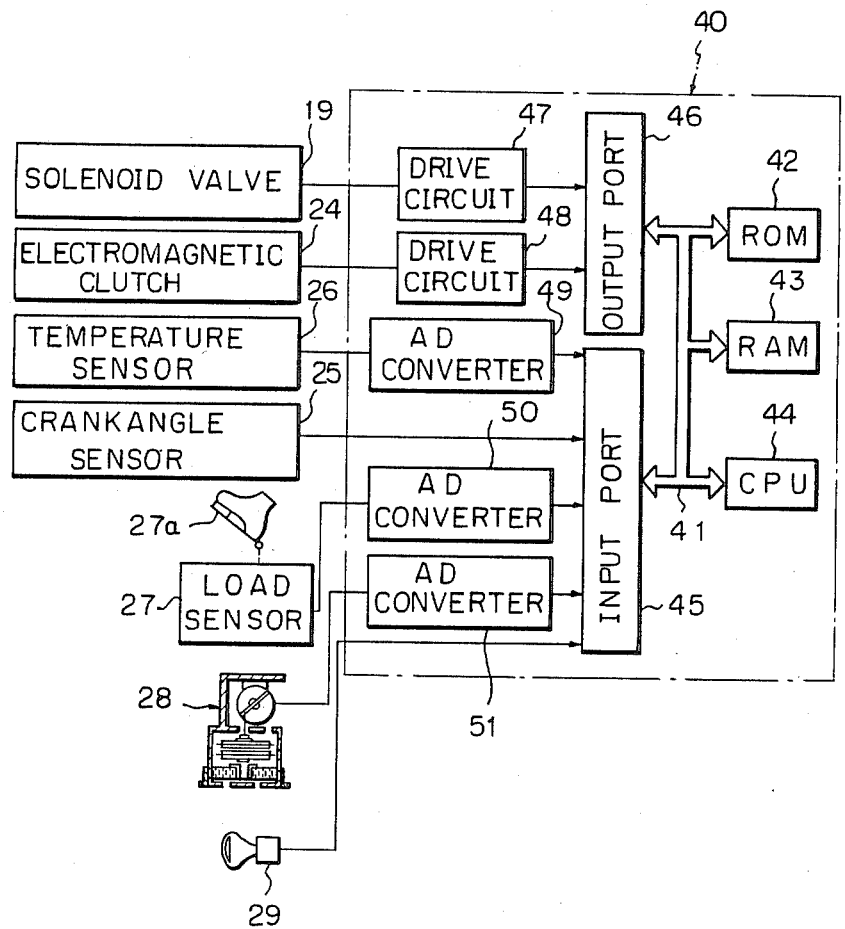
FIG. 2 is a block diagram of the electronic control unit illustrated in FIG. 1.

Referring to FIG. 2, the electronic control unit 40 is constructed as a computer and comprises a ROM (read-only memory) 42, a RAM (random-access memory) 43, a CPU (microprocessor, etc.) 44, an input port 45, and an output port 46. The ROM 42, the RAM 43, the CPU 44, the input port 45, and the output port 46 are interconnected via a bidirectional bus 41. The solenoid valve 19 is connected to the output port 46 via a drive circuit 47.

As illustrated in FIG. 1, a drive pulley 21 is mounted on the crankshaft 12 of the engine 1, and a driven pulley 23 is driven by the drive pulley 21 via a belt 22. This driven pulley 23 is connected to the mechanically driven charger 15 via an electromagnetic clutch 24. When the electromagnetic clutch 24 is engaged, the mechanically driven charger 15 is driven by the diesel engine 1, and when the electromagnetic clutch 24 is disengaged, the operation of the mechanically drive clutch 15 is stopped. As illustrated in FIG. 2, the electromagnetic clutch 24 is connected to the output port 46 via a drive circuit 48 and controlled by the output signal from the electronic control unit 40.

As illustrated in FIG. 1, a crank angle sensor 25 is arranged adjacent to the drive pulley 21. The crank angle sensor 25 produces an output pulse at each rotation of the crankshaft 1a of the engine 1 by a predetermined angle. As illustrated in FIG. 2, the crank angle sensor 25 is connected to the input port 45, and the rotating speed of the engine 1 is calculated from the output pulses of the crank angle sensor 25.

As illustrated in FIG. 1, a temperature sensor 26 for detecting the temperature of the cooling water of the engine 1 is mounted on the cylinder block 2 and, as illustrated in FIG. 2, the temperature sensor 26 is connected to the input port 45 via an AD converter 49. The temperature sensor 26 produces an output voltage which is proportional to the temperature of the cooling water of the engine 1.

As illustrated in FIG. 2, an accelerator pedal 27a is connected to a load sensor 27 for detecting the depression of the accelerator pedal 27a, and this load sensor 27 is connected to the input port 45 via an AD converter 50. The load sensor 27 produces an output voltage which is proportional to the depression of the accelerator pedal 27a, i.e., the engine load. In addition, an atmospheric pressure sensor 28 is connected to the input port 45 via an AD converter 51. This atmospheric pressure sensor 28 produces an output voltage which is proportional to the atmospheric pressure. Furthermore, a starter switch 29 is connected to the input port 45. This starter switch 29 is made ON when the starter motor (not shown) is operated to start the engine 1. Consequently, it is possible to determine whether or not the starter motor is operating from the output signal of the starter switch 29.

Turning to FIG. 1, the turbocharger 30 comprises a compressor 31 and a turbine 32. The intake duct 14 is connected to the outside air via the compressor 31 and an air cleaner 33, and the exhaust manifold 11 is connected to an exhaust gas outflow passage 35 via an exhaust gas inflow passage 34 and the turbine 32. The exhaust gas inflow passage 34 and the exhaust gas outflow passage 35 are interconnected by an exhaust gas bypass passage 36 which bypasses the turbine 32, and a waste gate valve 38 actuated by a diaphragm type actuator 37 is arranged in the exhaust gas bypass passage 36. The diaphragm chamber 39 of the actuator 37 is connected to the intake duct 14. When the pressure, that is, the charging pressure, in the intake duct 14 is increased, the opening degree of the waste gate valve 38 is increased, and thus the amount of exhaust gas flowing within the exhaust gas bypass passage 36 is increased. As a result, since the rotating speed of the turbine 32 and the compressor 31 is decreased, the charging pressure is accordingly decreased. Consequently, the charging pressure is controlled by the waste gate valve 38 so that the charging pressure does not exceed a predetermined charging pressure.

In the embodiment illustrated in FIG. 1, when the electromagnetic clutch 24 is engaged, and thus driven by the engine 1, the bypass valve 17 is closed. Conversely, when the electromagnetic clutch 24 is disengaged, and thus the operation of the electromagnetic clutch 15 is stopped, the bypass valve 17 remains open.

FIG. 3 illustrates the control of the mechanically driven charger 15 and the bypass valve 17, which is carried out in response to a change in an engine speed, an engine load, the temperature of the cooling water, and the atmospheric pressure. In FIG. 3, (A), (B), (C) and (D) indicate the control in the following engine operating states.

(A) the vehicle is driven at a low altitude before completion of the warm-up.

(B) the vehicle is driven at a low altitude after completion of the warm-up.

(C) the vehicle is driven at a high altitude before completion of the warm-up.

(D) the vehicle is driven at a high altitude after completion of the warm-up.

In FIG. 3, the hatching areas P and Q indicate areas in which the mechanically driven charger 15 is operated and, in addition, the bypass valve 17 is closed. The remaining area indicates an area in which the mechanically driven charger 15 is stopped and, in addition, the bypass valve 17 remains open. In FIGS. 3(A), (B), (C), and (D), the ordinate L indicates an engine load, and the abscissa NE indicates an engine speed. In addition, in FIGS. 3(A), (B), (C), and (D), the broken line X indicates the lower limit of the possible charging operation of the turbocharger 30, i.e., the charging operation of the turbocharger 30 is carried out in an engine operating state above the broken line X. That is, the charging operation of the turbocharger 30 is carried out when the engine is operating at a middle speed under a heavy load or at a high speed under a middle and heavy load.

The control of the mechanically driven charger 15 and the bypass valve 17 in the states (A), (B), (C), and (D) will be described hereinafter.

(A) the vehicle is driven at a low altitude before completion of the warm-up.

In this state, as illustrated by the hatched area Q, the mechanically driven charger 15 is operated when the engine is operating under a middle or light load at a speed which is lower than a predetermined fixed speed, for example, 600 r.p.m. That is, when the engine is started, the mechanically driven charger 15 is operated, and the bypass valve 17 is closed. As mentioned above, by operating the mechanically driven charger 15 when the engine is started, it is possible to increase the pressure of air in the combination chamber 5 before the compression stroke is started. Consequently, even if the engine has the compression ratio of about 16:1 through 18:1, the temperature of air in the combustion chamber 5 can be increased beyond the ignition temperature of the fuel at the end of the compression stroke, and thus it is possible to easily start the engine.

In addition, as illustrated by the area P, when the engine is operating at a low or middle speed which is lower than $NE_1$, if the engine load L exceeds $L_1$, the mechanically driven charger 15 is operated.

Further, in some engines, the temperature of air in the combustion chamber 5 is not sufficiently increased when the engine is operating at a low speed under a light load before completion of the warm-up. Furthermore, in other engines, the temperature of air in the combustion chamber 5 sometimes is not sufficiently increased when the engine is operating at a low or middle speed before completion of the warm-up. In such engines, the mechanically driven charger 15 may be additionally operated in the areas surrounded by the broken lines S or R in FIG. 3(A).

(B) the vehicle is driven at a low altitude after completion of the warm-up.

In this state, as illustrated by the area P, the mechanically driven charger 15 is operated only when the engine is operating at a low or middle speed under a heavy load, except where the engine is started again after completion of the warm-up. That is, the mechanically driven charger 15 is operated when the engine speed NE is lower than $NE_1$ and when the engine load L is higher than $L_1$. When the engine is operating at a high speed under a heavy load, that is, when the engine speed NE is higher than $NE_1$ and the engine load L is higher than $L_1$, the operation of the mechanically driven charger 15 is stopped, and the bypass valve 17 is opened. In addition, when the engine 1 is operating under a partial load, that is, when the engine load L is lower than $L_1$, the operation of the mechanically driven charger 15 is also stopped, and the bypass valve 17 is opened. Consequently, when the engine is operating under a partial load, air is fed into the surge tank 13 via the bypass passage 16, and this air is not pressurized as long as the turbocharger 30 is not working. In the present invention, the engine 1 has the compression ratio of about 16:1 through 18:1. However, if the warm-up of the engine is completed, even if the air is not pressurized as mentioned above, the temperature of air in the combustion chamber 5 can be increased beyond the ignition temperature of the fuel, and thus it is possible to obtain a stable combustion. In addition, by giving the engine 1 a compression ratio of about 16:1 through 18:1, the compression force to be exerted by the piston is reduced, and thus it is possible to improve the fuel consumption. Furthermore, since the operation of the mechanically driven charger 15 is stopped, the loss of the output power of the engine 1 is reduced, and thus it is possible to further reduce the fuel consumption. That is, by lowering the compression ratio compared with ordinary diesel engines, and by stopping the operation of the mechanically driven charger 15, it is possible to minimize the fuel consumption when the engine 1 is operating under a partial load.

In some engines, when the engine 1 is operating in an idling state or under an extremely low load, or when the vehicle is descending a slope while injecting fuel from the fuel injector 9, the temperature of the engine 1 decreases, and thus the temperature of air in the combustion chamber 5 can not be increased beyond the ignition temperature of the fuel. As a result, a misfire occurs, and white smoke is generated. In such engines, preferably the mechanically driven charger 15 is operated in the area surrounded by the broken line T in FIG. 3(B). In addition, as illustrated by the area Q, the mechanically driven charger 15 is operated when the engine 1 is started again after completion of the warm-up.

As understood from FIG. 3(B), when the engine 1 is operating at a low speed under a heavy load, the charging operation by the turbocharger 30 is not carried out. However, at this time, since the mechanically driven charger 15 is operated, the charging operation by the mechanically driven charger 15 is effected, and thus it is possible to increase the output power of the engine 1 even when the engine 1 is operating at a low speed under a heavy load.

When the engine 1 is operating at a middle speed under a heavy load, the charging operation by the turbocharger 30 and the charging operation by the mechanically driven charger 15 are effected at the same time, and thus a two stage charging operation is carried out. As a result, since the pressure in the intake port 7 is sufficiently increased, it is possible to considerably increase the output power of the engine 1.

When the engine 1 is operating at a high speed under a heavy load, the charging operation by the mechanically driven charger 15 is stopped, and the charging operation is carried out by only the turbocharger 30. When the engine 1 is operating at a high speed under a heavy load, the energy of the exhaust gas becomes high, and thus the air pressure increasing operation by the turbocharger 15 becomes strong. Consequently, it is possible to sufficiently increase the pressure of air fed into the combustion chamber 5 by only the turbocharger 30. Therefore, at this time, it is not necessary to operate the mechanically driven charger 15. In addition, by stopping the operation of the mechanically driven charger 15, the loss of the output power of the engine 1 is decreased, and thus it is possible to reduce the fuel consumption.

(C) the vehicle is driven at a high altitude before completion of the warm-up.

At a high altitude, the density of air decreases compared with that of air at a low altitude. Consequently, when the vehicle is driven at a high altitude, the pressure of air in the combustion chamber 5 becomes lower compared with the case where the vehicle is driven at a low altitude, and thus the engine operating area is widened in which the temperature of air in the combustion chamber 5 does not increase beyond the ignition temperature of the fuel. Consequently, as illustrated by the area P in FIG. 3(C), before completion of the warm-up, the mechanically driven charger 15 is automatically operated when the engine 1 is started and, in addition, the mechanically driven charger 15 is also operated when the engine is operating under a partial load at a low or middle speed. In some engines, it is necessary to operate the mechanically driven charger 15 in the area surrounded by the broken line U in FIG. 3(C). Consequently, in such engines, the mechanically driven charger 15 is operated in all operating states of the engine 1.

(D) the vehicle is driven at a high altitude after completion of the warm-up.

In this state, as illustrated by the area P in FIG. 3(D) when the engine 1 is operating at a low or middle speed under a relatively heavy load, the mechanically driven charger 15 is operated. That is, when the engine speed NE is lower than $NE_1$ and the engine load L is higher than $L_2$, the mechanically driven charger 15 is operated. In addition, as illustrated by the area Q in FIG. 3(D), the mechanically driven charger 15 is operated when the engine 1 is operating at a low speed under a light load, or at a low speed under a middle load, or at a middle speed under a light load, the engine load $L_2$ in FIG. 3(D) is lower than the engine load $L_1$ in FIGS. 3(A) and (B), and the area Q in FIG. 3(D) is wider than the area T in FIG. 3(B). In some engines, it is necessary to operate the mechanically driven charger 15 in the area surrounded by the broken line V in FIG. 3(D). In such engines, the mechanically driven charger 15 is operated in all operating states of the engine 1.

The operating area and the non-operating area of the mechanically driven charger 15 and the opening area and the closing area of the bypass valve 17, illustrated in FIGS. 3(A), (B), (C) and (D), are stored in the ROM 42 in the form of a map.

FIG. 4 illustrates a flow chart used for controlling the mechanically driven charger 15 and the bypass valve 17 as explained with reference to FIG. 3.

Figure 5:
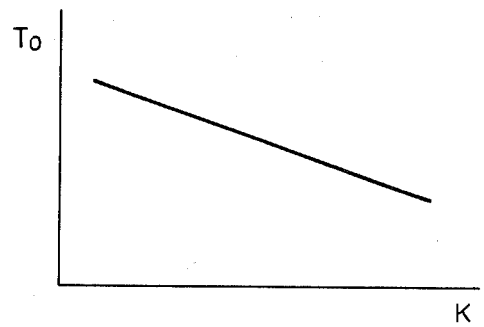
FIG. 5 is a diagram illustrating the relationship between the waiting time and the temperature of cooling water of the engine.
Figure 6:
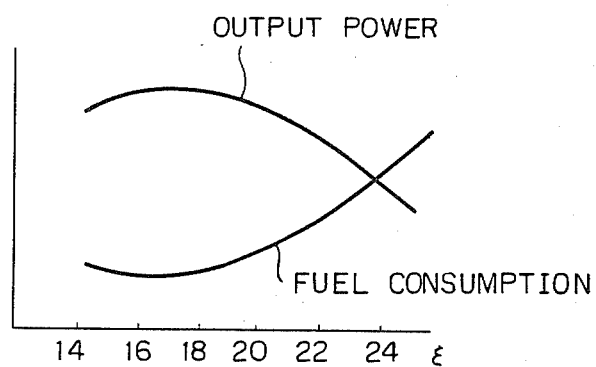
FIG. 6 is a diagram illustrating the output power of the engine and the fuel consumption.

Referring to FIG. 4, in step 60, it is determined whether the starter switch 29 is ON, that is, whether the starter motor (not shown) is operated. If the starter switch 29 is ON, the routine goes to step 61. In step 61, the mechanically driven charger 15 is operated by engaging the electromagnetic clutch 24, and at the same time, the bypass valve 17 is closed. Then, in step 62, a waiting time $T_0$ is determined on the basis of the temperature of the cooling water of the engine 1. As illustrated in FIG. 5, this waiting time $T_0$ is decreased as the temperature K of the cooling water of the engine 1 is increased. The relationship between the waiting time $T_0$ and the temperature K, illustrated in FIG. 5, is stored in the ROM 42, and thus, in step 62, the waiting time $T_0$ is obtained from this relationship stored in the ROM 42. When the starter switch 29 is turned from ON to OFF, the routine goes from step 60 to step 63, and it is determined whether the elapsed time T has become larger than the waiting time $T_0$, that is, a time $T_0$ has elapsed after the starter switch 29 is made OFF. If $T \leq T_0$, the processing cycle is completed. Consequently, the mechanically driven charger 15 continues to operate a little while after the engine 1 is started, and the length of time during which the mechanically driven charger 15 continues to operate becomes longer as the temperature K of the cooling water falls. As the temperature K of the cooling water falls, a misfire and white smoke are more easily generated. Therefore, by elongating the operating time of the mechanically driven charger 15 as the temperature K of the cooling water falls, it is possible to prevent a misfire and the generation of white smoke after the engine 1 is started.

If it is determined in step 63 that the elapsed time T exceeds the waiting time $T_0$, the routine goes to step 64. In step 64, it is determined whether the temperature K of the cooling water is higher than a predetermined fixed temperature $K_0$, that is, whether the warm-up of the engine 1 is completed. If $K \leq K_0$, the routine goes to step 65. In step 65, it is determined whether the atmospheric pressure P is higher than a predetermined fixed pressure $P_0$, that is, whether the vehicle is driven at a low altitude. If $P > P_0$, the routine goes to step 66, and the control of the mechanically driven charger 15 and the bypass valve 17 is carried out on the basis of the map (A) illustrated in FIG. 3. If $P \leq P_0$, that is, if the vehicle is driven at a high altitude, the routine goes to step 67, and the control of the mechanically driven charger 15 and the bypass valve 17 is carried out on the basis of the map (C) illustrated in FIG. 3.

If $K > K_0$, that is, if the warm-up of the engine 1 is completed, the routine goes to step 66, and it is determined whether the atmospheric pressure P is higher than $P_0$. If $P > P_0$, the routine goes to step 69, and the control of the mechanically driven charger 15 and the bypass valve 17 is carried out on the basis of the map (B) illustrated in FIG. 3. If $P \leq P_0$, the routine goes to step 70, and the control of the mechanically driven charger 15 and the bypass valve 17 is carried out on the basis of the map (D) illustrated in FIG. 3.

Figure 7:
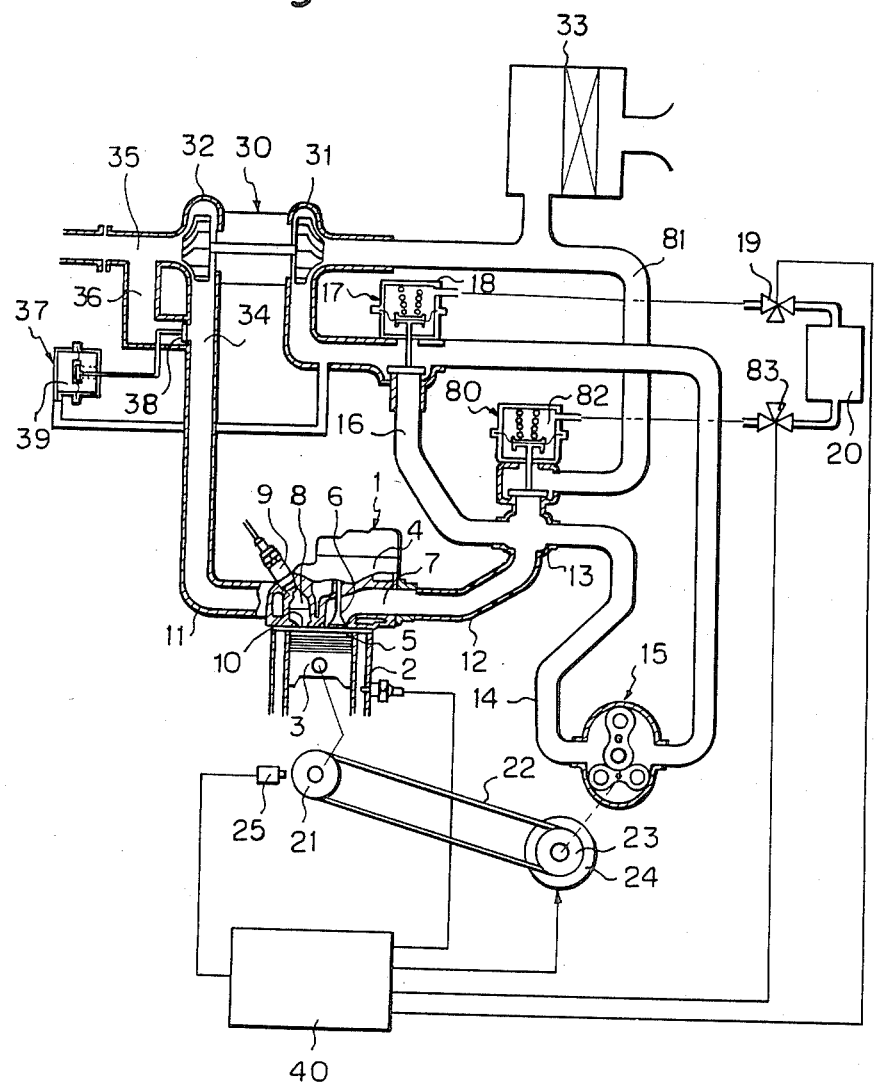
FIG. 7 is a schematically illustrated view of a second embodiment of a diesel engine according to the present invention.
Figure 8:
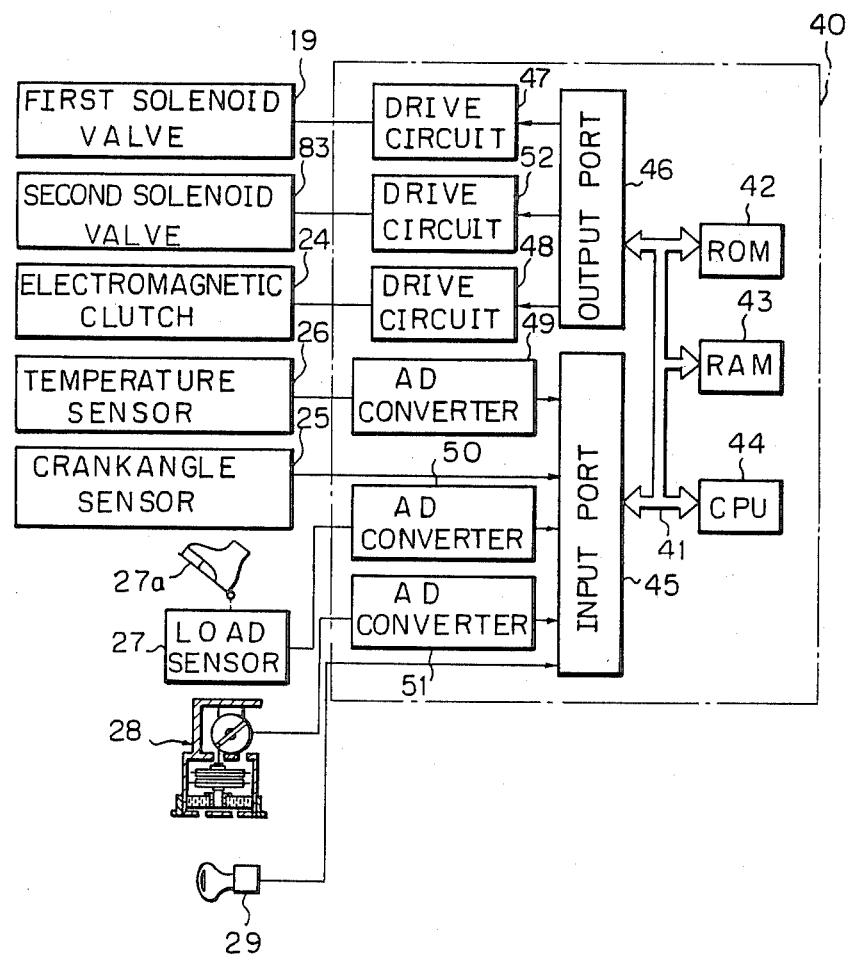
FIG. 8 is a block diagram of the electronic control unit illustrated in FIG. 7.
Figure 9A:
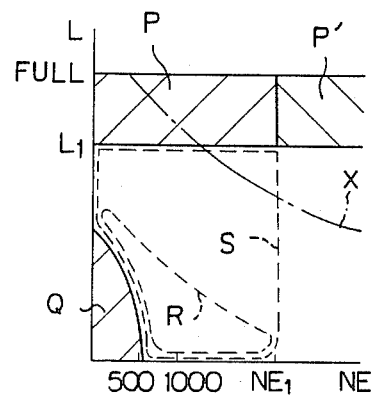
FIGS. 9A-D are diagrams illustrating the operation of the mechanically driven charger and the bypass valve of the second embodiment.
Figure 9B:
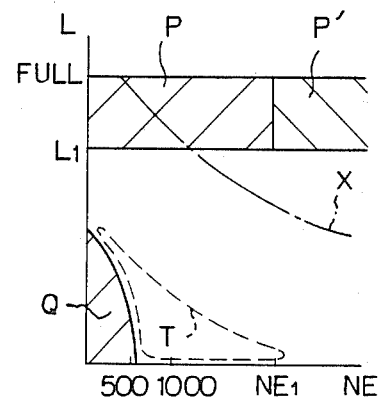
Figure 9C:
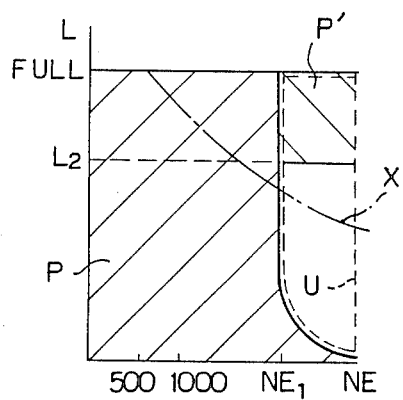
Figure 9D:
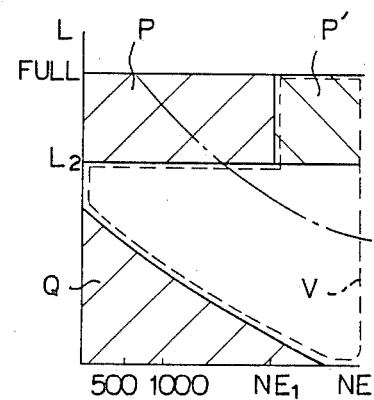

FIG. 7 illustrates a second embodiment. This embodiment is different from the first embodiment illustrated in FIG. 1 in the following two points. That is, another bypass valve 80 is provided in addition to the bypass valve 17 (hereinafter, the bypass valve 17 is referred to as the first bypass valve, and the bypass valve 80 is referred to as the second bypass valve), and the surge tank 13 is connected to the air cleaner 33 via the second bypass valve 80 and another bypass passage 81. The vacuum chamber 18 of the first bypass valve 17 is connected to the vacuum tank 20 via a first solenoid valve 19 which can be opened to the outside air, and the vacuum chamber 82 of the second bypass valve 80 is connected to the vacuum tank 20 via a second solenoid valve 83 which can be opened to the outside air. As illustrated in FIG. 8, the first solenoid valve 19 and the second solenoid valve 83 are connected to the output port 46 via corresponding drive circuits 47 and 52.

FIG. 9 illustrates the control of the mechanically driven charger 15, the first bypass valve 17, and the second bypass valve 80, which is carried out in response to change in an engine speed, an engine load, the temperature of the cooling water, and the atmospheric pressure. In FIG. 9, (A), (B), (C), and (D) indicate the control in the following engine operating states in the same manner as illustrated in FIG. 3.

(A) the vehicle is driven at a low altitude before completion of the warm-up.

(B) the vehicle is driven at a low altitude after completion of the warm-up.

(C) the vehicle is driven at a high altitude before completion of the warm-up.

(D) the vehicle is driven at a high altitude after completion of the warm-up.

In FIG. 9, the areas P, P′, Q, and the remaining area indicate the following states.

(i) areas P and Q

The mechanically driven charger 15 is operated. In addition, the first bypass passage 16 is closed by the first bypass valve 17, and the second bypass valve 81 is closed by the second bypass valve 80.

(ii) area P′

The operation of the mechanically driven charger 15 is stopped. In addition, the first bypass valve 17 opens the first bypass passage 16, and the second bypass valve 80 closes the second bypass passage 81.

(iii) area except for areas P, Q and P′

The operation of the mechanically driven charger 15 is stopped. In addition, the first bypass valve 17 closes the first bypass passage 16, and the second bypass valve 80 opens the second bypass passage 81.

(iv) The areas surrounded by the broken lines R, S, T, U, and V indicate areas in which, preferably, the mechanically driven charger 15 is operated in some particular engines, in the same manner as illustrated in FIG. 3. In these areas R, S, T, U, and V, the first bypass valve 17 closes the first bypass passage 16, and the second bypass valve 80 closes the second bypass passage 81.

Figure 10A:
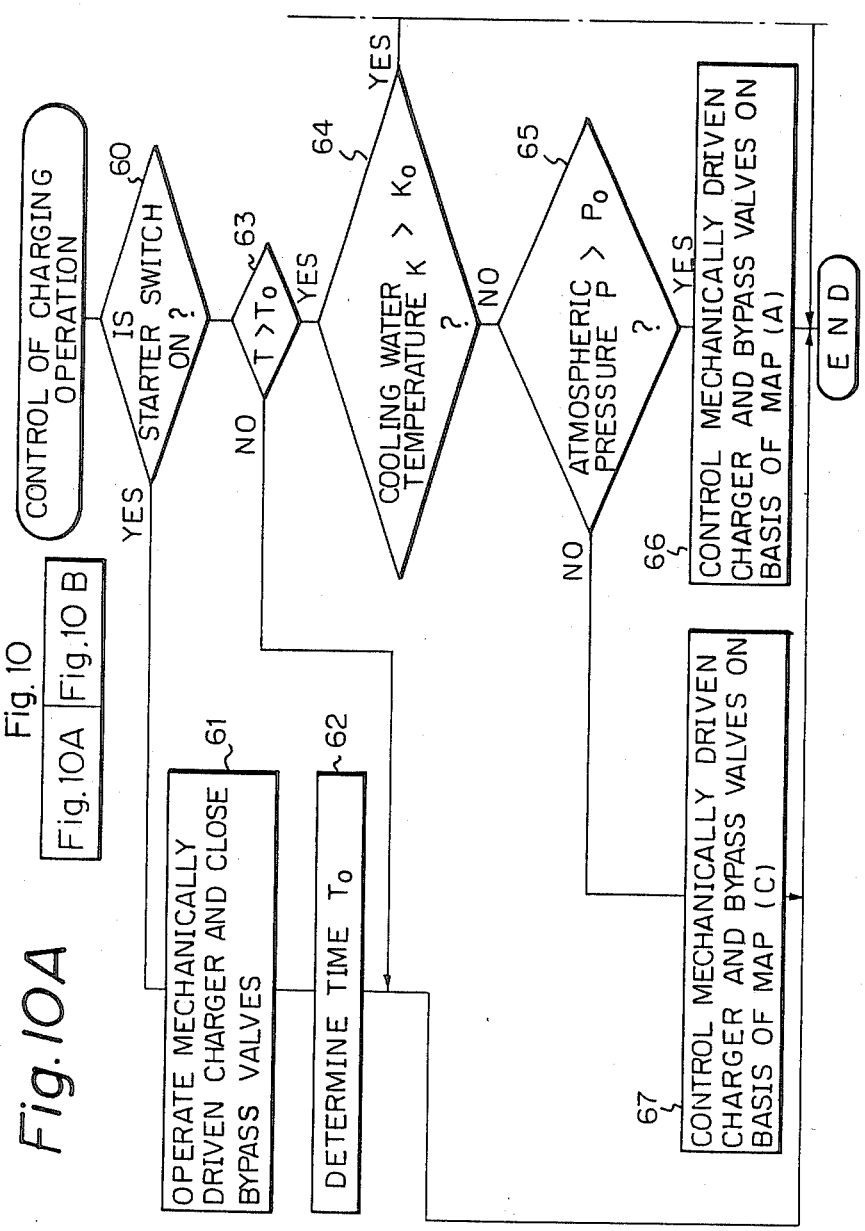
FIGS. 10A-B are a flow chart for carrying out the control of the charging operation.
Figure 10B:
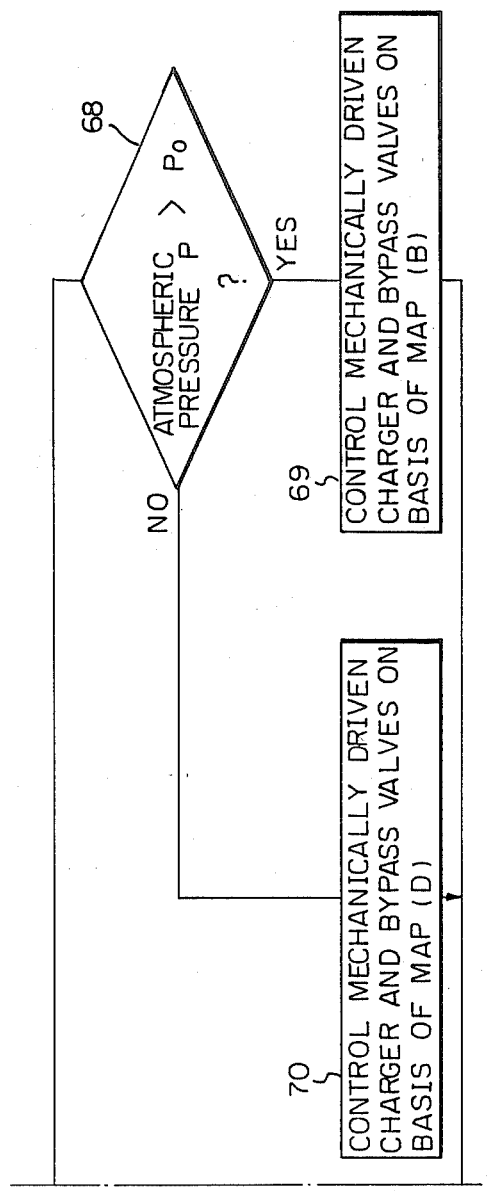

FIG. 10 illustrates a flow chart used for controlling the mechanically driven charger 15, the first bypass valve 17 and the second bypass valve 80 of the second embodiment. This flow chart is slightly different from the flow chart illustrated in FIG. 4 in the contents of steps 61, 66, 67, 69, but the remaining steps in FIG. 10 are the same as the corresponding steps in FIG. 4. Consequently, the steps 61, 66, 67, 69, 70 in FIG. 10 will be mainly described hereinafter.

Referring to FIG. 10, if the starter switch 29 is ON, the routine goes to step 61, and the mechanically driven charger 15 is operated. At this time, the first bypass valve 17 closes the first bypass passage 16, and the second bypass valve 80 closes the second bypass passage 81. Consequently, at this time, air is fed into the combustion chamber 5 via the turbocharger 30 and the mechanically driven charger 15. After the starter switch 29 is turned from ON to OFF, the mechanically driven charger 15 continues to be operated during the waiting time $T_0$ which is determined based on the temperature of the cooling water. Subsequently, in steps 66, 67, 69, 70, the mechanically driven charger 15, the first bypass valve 17, and the second bypass valve 80 are controlled on the basis of the corresponding map (A), (B), (C) or (D) of FIG. 9.

The substantial difference between the operation in FIG. 3 and the operation in FIG. 9 resides in the operation in the area except for the areas P, Q, and P'. That is, in the areas P and Q of FIG. 9, air is fed into the combustion chamber 5 via the turbocharger 30 and the mechanically driven charger 15. This flow route of air is the same as that of air in the areas P and Q in FIG. 3. In addition, in the area P' of FIG. 9, air pressurized by the turbocharger 30 is fed into the combustion chamber 5 without passing through the mechanically driven charger 15. This flow route of air is also the same as that of air in the corresponding area of FIG. 3, in which the engine is operating at a high speed under a heavy load. Conversely, in the area except for the areas P, Q, and P' in FIG. 9, air is directly fed into the combustion chamber 5 without passing through the turbocharger 30 and the mechanically driven charger 15. In the first embodiment illustrated in FIG. 1, air always passes through the turbocharger 30 regardless of the operating state of the engine 1, and thus air passes through the turbocharger 30 in the area except for the areas P and Q of FIG. 3. However, if air is introduced into the turbocharger 30 when the turbocharger 30 does not carry out the charging operation, the flow resistance of the air is increased, and thus the pressure of air fed into the combustion chamber 5 is decreased. However, in the area except for the areas P, Q and P' in FIG. 9, air is directly fed into the combustion chamber 5. As a result, air fed into the combustion chamber 5 is maintained at the atmospheric pressure, and thus it is possible to increase the temperature of air in the combustion chamber 5 at the end of the compression stroke.

Figure 11:
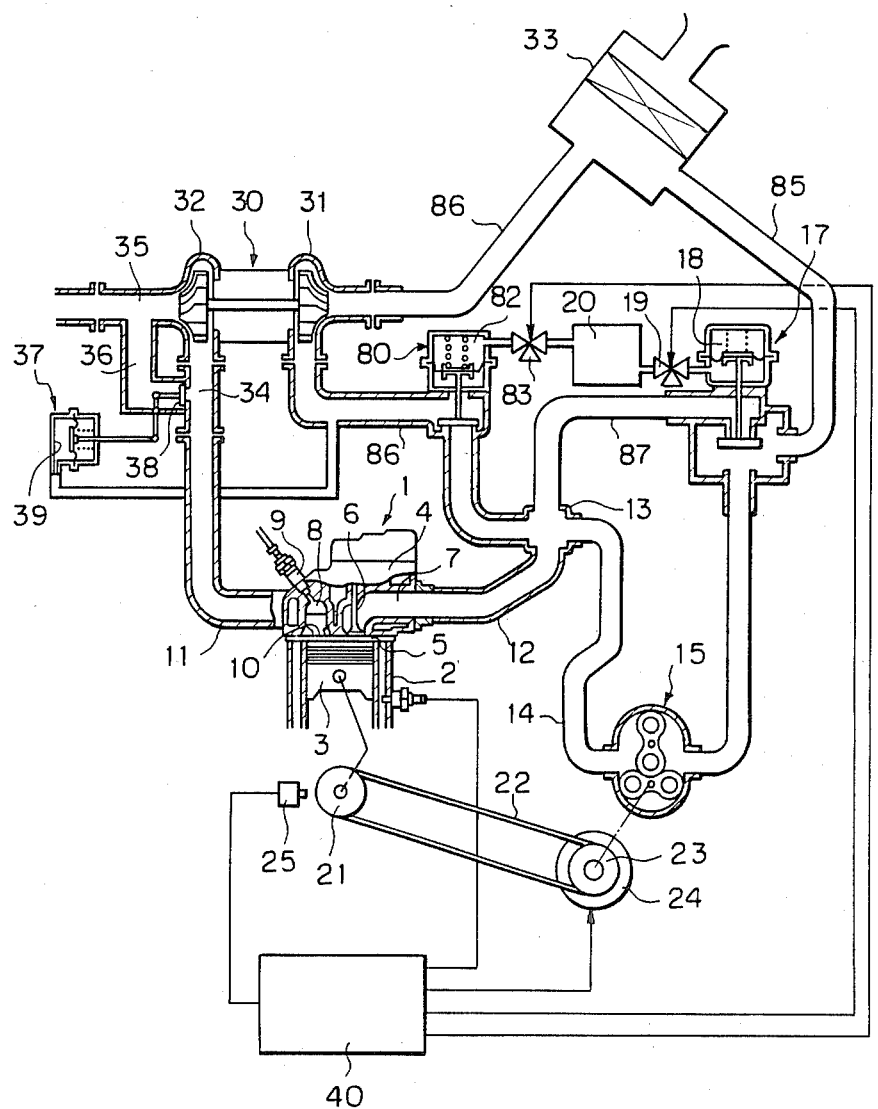
FIG. 11 is a schematically illustrated view of a third embodiment of a diesel engine according to the present invention.
Figure 12A:
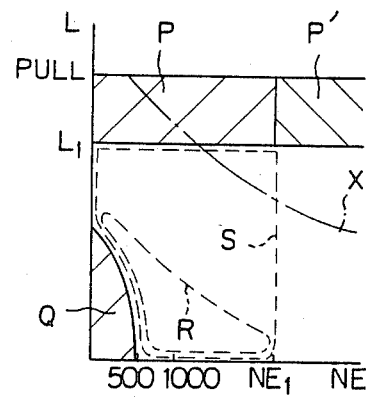
FIGS. 12A-D are diagrams illustrating the operation of the mechanically driven charger and the bypass valve of the third embodiment.
Figure 12B:
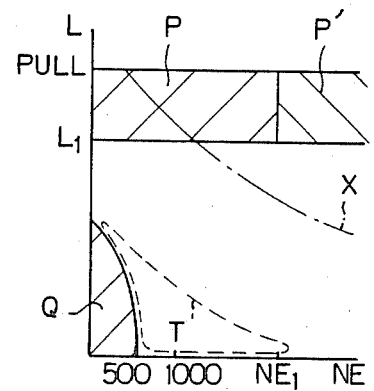
Figure 12C:
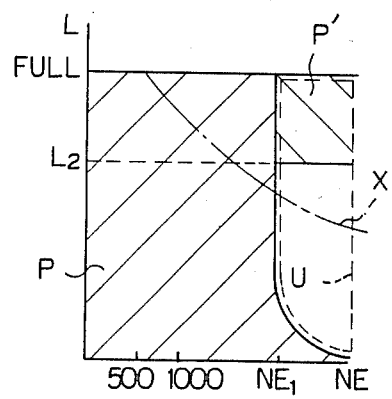
Figure 12D:
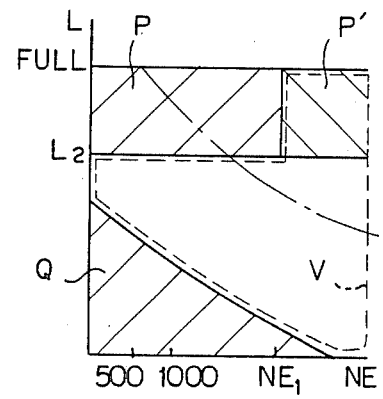

FIG. 11 illustrates a third embodiment. This embodiment is different from the second embodiment illustrated in FIG. 7 in the following points. That is, in the third embodiment, the intake passage interconnecting the air cleaner 33 to the surge tank 13 is divided into a first intake passage 85 and a second intake passage 86. The mechanically driven charger 15 and the first bypass valve 17 are arranged in the first intake passage 85, and the compressor 31 of the turbocharger 30 and the second bypass valve 80 are arranged in the second intake passage 86. In addition, the first intake passage 85 is divided into the intake duct 14 equipped with the mechanically driven charger 15 and the first bypass passage 87 bypassing the mechanically driven charger 15. The electronic control unit 40 illustrated in FIG. 11 has the same circuit as that illustrated in FIG. 8.

FIG. 12 illustrates the control of the mechanically driven charger 15, the first bypass valve 17, and the second bypass valve 80, which is carried out in response to a change in an engine speed, an engine load, the temperature of the cooling water, and the atmospheric pressure. In FIG. 12, (A), (B), (C), and (D) indicate the control in the following engine operating states in the same manner as illustrated in FIG. 9.

(A) the vehicle is driven at a low altitude before completion of the warm-up.

(B) the vehicle is driven at a low altitude after completion of the warm-up.

(C) the vehicle is driven at a high altitude before completion of the warm-up.

(D) the vehicle is driven at a high altitude after completion of the warm-up.

In FIG. 12, the areas P, P', Q, and the remaining area indicate the following states.

(i) areas P and Q

The mechanically driven charger 15 is operated. In addition, the first bypass valve 17 closes the bypass passage 87 and connects the intake duct 14 to the air cleaner 33, and the second bypass valve 80 closes the second intake passage 86.

(ii) area P'

The operation of the mechanically driven charger 15 is stopped. In addition, the first bypass valve 17 closes the bypass passage 87 and connects the intake duct 14 to the air cleaner 33, and the second bypass valve 80 opens the second intake passage 86.

(iii) area except for the areas P, Q and P'

The operation of the mechanically driven charger 15 is stopped. The first bypass valve 17 closes the intake duct 14 and connects the bypass passage 87 to the air cleaner 33, and the second bypass valve 80 closes the second intake passage 86.

(iv) The areas surrounded by the broken lines R, S, T, U, and V indicate areas in which, preferably, the mechanically driven charge 15 is operated in some particular engines, in the same manner as illustrated in FIG. 3. In these areas R, S, T, U, and V, the first bypass valve 17 closes the bypass passage 87 and connects the intake duct 14 to the air cleaner 33, and the second bypass valve 80 closes the second intake passage 86.

In the third embodiment illustrated in FIG. 11, a flow chart which is the same as that illustrated in FIG. 10 is used for controlling the mechanically driven charger 15, the first bypass valve 17, and the second bypass valve 80. Consequenty, when the starter switch 29 is ON, the mechanically driven charger 15 is operated. At this time, the first bypass valve 17 closes the bypass passage 87 and connects the intake duct 14 to the air cleaner 33, and the second bypass valve 80 closes the second intake passage 86. Consequently, at this time, air is fed into the combustion chamber 5 via only the mechanically driven charger 15. The mechanically driven charger 15 continues to operate during the waiting time $T_0$, which is determined by the temperature of the cooling water. Subsequently, the mechanically driven charger 15, the first bypass valve 17, and the second bypass valve 80 are controlled on the basis of the corresponding maps (A), (B), (C), and (D) of FIG. 12.

The difference between the operation in FIG. 12 and the operation in FIG. 9 resides in that, in FIG. 12, the second bypass valve 80 is opened to make the turbocharger 30 work only when the engine 1 is operating at a high speed under a heavy load (area P' in FIG. 12), and that the second bypass valve 80 is closed when the engine is operating in a state other than a high speed and heavy load operating state. That is, in the area P, the bypass passage 87 is closed, and the mechanically driven charger 15 is operated. At this time, the charging operation is carried out by only the mechanically driven charger 15. In an area except for the areas P, P', and Q, the operation of the mechanically driven charger 15 is stopped, and the bypass 87 is connected to the air cleaner 33. Consequently, in this area, air is directly fed into the combustion chamber 5 without passing through the mechanically driven charger 15 and the turbocharger 30.

Also in this embodiment, in an area except for the areas P, P', and Q of FIG. 12, since air is directly fed into the combustion chamber 5, the pressure of air fed into the combustion chamber 5 is maintained at the atmospheric pressure, and thus it is possible to increase the temperature of air in the combustion chamber 5 at the end of the compression stroke. In addition, in the third embodiment, the charging operation by the turbocharger 30 and the charging operation by the mechanically driven charger 15 are not carried out at the same time. That is, the charging operation is effected by only the turbocharger 30 when the engine 1 is operating at a high speed under a heavy load, and the charging operation is effected by only the mechanically driven charger 15 when the engine 1 is operating in a state other than a high speed and heavy load operating state. The third embodiment is advantageously applied to a diesel engine which otherwise would not have sufficient durability to enable the use therewith of the two stage charging operation by both the turbocharger 30 and the mechanically driven charger 15.

According to the present invention, by operating the mechanically driven charger 15 to carry out the charging operation when the engine 1 is started, even if the compression ratio is lowered, it is possible to easily start the engine 1. Consequently, since the compression ratio can be lowered as mentioned above, it is possible to lower the fuel consumption. In addition, in a predetermined engine operating state except when the engine 1 is started, for example, in a partial load operating state after completion of the warm-up, the operation of the mechanically driven charger 15 is stopped. In the present invention, since the engine 1 has a low compression ratio, when the mechanically driven charger 15 is stopped, a low fuel consumption can be obtained. In addition, when the mechanically driven charger 15 is stopped, the loss of the output power of the engine 1 is decreased, and thus the fuel consumption is further lowered. As a result, it is possible to minimize the fuel consumption. Furthermore, when the engine is operating at a high speed under a heavy load, a strong charging operation by the turbocharger 30 can be obtained.

While the invention has been described by reference to specific embodiments chosen for purposes of illustration, it should be apparent that numerous modifications could be made thereto by those skilled in the art without departing from the basic concept and scope of the invention.

What is claimed is:

1. A diesel engine comprising:
   a turbocharger driven by an exhaust gas of the engine;
   an intake passage;
   a mechanically driven charger arranged in said intake passage and mechanically driven by the engine;
   connection control means for controlling a mechanical connection between said mechanically driven charger and the engine;
   a bypass passage connected to said intake passage downstream of said mechanically driven charger;
   valve means controlling a bypass air flow flowing within said bypass passage;
   first detecting means for detecting a starting operation of the engine;
   second detecting means for detecting an operating state of the engine; and
   control means for controlling said connection control means and said valve means in response to output signals from said first detecting means and said second detecting means to connect said mechanically driven charger to the engine and shut off said bypass air flow when the engine is started or when the engine is operated in a predetermined first operating state, and to disconnect said mechanically driven charger from the engine and allow said bypass air flow when the engine is operating in a predetermined second operating state.

2. A diesel engine according to claim 1, wherein said turbocharger is arranged in said intake passage upstream of said mechanically driven charger, and said bypass passage is branched from said intake passage between said turbocharger and said mechanically driven charger and connected to said intake passage downstream of said mechanically driven charger.

3. A diesel engine according to claim 2, wherein said second detecting means comprises an engine speed detector for detecting the rotating speed of the engine, and an engine load detector for detecting the load of the engine, said control means controlling said connection control means and said valve means in response to output signals from said engine speed detector and said engine load detector to connect said mechanically driven charger to the engine and close said valve means when the engine is started or when the engine is operating in said first operating state, and to disconnect said mechanically driven charger from the engine and open said valve means when the engine is operating in said second operating state.

4. A diesel engine according to claim 3, wherein said first operating state is that wherein a load of the engine is higher than a predetermined load, and said second operating state is that wherein a load of the engine is lower than said predetermined load.

5. A diesel engine according to claim 3, wherein said first operating state is that wherein a load of the engine is higher than said predetermined load and the rotating speed of the engine is lower than a predetermined speed, and said second operating state is that wherein a load of the engine is lower than said predetermined load, and wherein the load of the engine is higher than said predetermined load and the rotating speed of the engine is higher than said predetermined speed.

6. A diesel engine according to claim 2, wherein said second detecting means comprises an engine speed detector for detecting the rotating speed of the engine, an engine load detector for detecting the load of the engine, a temperature detector for detecting the temperature of a coolant of the engine, and an atmospheric pressure detector for detecting the atmospheric pressure, said control means controlling said connection control means and said valve means in response to output signals from said engine speed detector, said engine load detector said temperature detector and said atmospheric pressure detector to connect said mechanically driven charger to the engine and close said valve means when the engine is started or when the engine is operating in said first operating state, and to disconnect said mechanically driven charger from the engine and open said valve means when the engine is operating in said second operating state.

7. A diesel engine according to claim 6, wherein said first operating state is that wherein: a load of the engine is higher than a predetermined load; a rotating speed of the engine is lower than a predetermined speed; and an atmospheric pressure is higher than a predetermined pressure, and said second operating state is that wherein: a load of the engine is lower than said predetermined load; a load of the engine is higher than said predetermined load and the rotating speed of the engine is higher than said predetermined speed; and an atmospheric pressure is higher than said predetermined pressure.

8. A diesel engine according to claim 6, wherein said first operating state is that wherein: the rotating speed of the engine is lower than a predetermined speed; the atmospheric pressure is lower than a predetermined pressure; and the temperature of the coolant is lower than a predetermined temperature, and said second operating state is that wherein: the rotating speed of the engine is higher than said predetermined speed; the atmospheric pressure is lower than said predetermined pressure; and the temperature of the coolant is lower than said predetermined temperature.

9. A diesel engine according to claim 6, wherein said first operating state is that wherein: the load of the engine is higher than a predetermined first load and the rotating speed of the engine is lower than a predetermined speed, or the load of the engine is lower than a predetermined second load which is lower than said first load; the atmospheric pressure is lower than a predetermined pressure; and the temperature of the coolant is higher than a predetermined temperature, and said second operating state is that wherein: the load of the engine is higher than said first load and the rotating speed of the engine is higher than said predetermined speed, or the load of the engine is a load between said first load and said second load; the atmospheric pressure is lower than said predetermined pressure; and the temperature of the coolant is higher than said predetermined temperature.

10. A diesel engine according to claim 1, wherein said turbocharger is arranged in said intake passage upstream of said mechanically driven charger, said bypass passage comprising a first bypass passage bypassing said mechanically driven charger, and a second bypass passage bypassing both said turbocharger and said mechanically driven charger, said valve means comprising a first bypass valve for controlling a bypass air flow flowing within said first passage, and a second bypass valve for controlling a bypass air flow flowing within said second bypass passage, said second operating state comprising a first part and a second part, said first bypass valve and said second bypass valve being closed when the engine is started or when the engine is operating in said first operating state, said first bypass valve being closed and said second bypass valve being open when the engine is operating in the first part of said second operating state, said first bypass valve being open and said second bypass valve being closed when the engine is operating in the second part of said second operating state.

11. A diesel engine according to claim 10, wherein said second detecting means comprises an engine speed detector for detecting the rotating speed of the engine, and an engine load detector for detecting the load of the engine, said control means controlling said first bypass valve and said second bypass valve in response to output signals from said engine speed detector and said engine load detector to: close said first bypass valve and said second bypass valve when the engine is operating in said first operating state; close said first bypass valve and open said second bypass valve when the engine is operating in the first part of said second operating state; and open said first bypass valve and close said second bypass valve when the engine is operating in the second part of said second operating state.

12. A diesel engine according to claim 11, wherein said first operating state is that wherein the load of the engine is higher than said predetermined load and the rotating speed of the engine is lower than a predetermined speed, the first part of said second operating state being that wherein the load of the engine is lower than said predetermined load, and the second part of said second operating state being that wherein the load of the engine is higher than said predetermined load and the rotating speed of the engine is higher than said predetermined speed.

13. A diesel engine according to claim 10, wherein said second detecting means comprises an engine speed detector for detecting the rotating speed of the engine, an engine load detector for detecting the load of the engine, a temperature detector for detecting the temperature of the coolant of the engine, and an atmospheric pressure detector for detecting the atmospheric pressure, said control means controlling said first bypass valve and said second bypass valve in response to output signals from said engine speed detector and said engine load detector to: close said first bypass valve and said second bypass valve when the engine is operating in said first operating state; close said first bypass valve and open said second bypass valve when the engine is operating in the first part of said second operating state; and open said first bypass valve and close said second bypass valve when the engine is operating in the second part of said second operating state.

14. A diesel engine according to claim 13, wherein said first operating state is that wherein: the load of the engine is higher than a predetermined load; the rotating speed of the engine is lower than a predetermined speed; and the atmospheric pressure is higher than a predetermined pressure, the first part of said second operating state being that wherein: the load of the engine is lower than said predetermined load and the atmospheric pressure is higher than said predetermined pressure, and the second part of said second operating state being that wherein: the load of the engine is higher than said predetermined load; the rotating speed of the engine is higher than said predetermined speed; and the atmospheric pressure is higher than said predetermined pressure.

15. A diesel engine according to claim 13, wherein said first operating state is that wherein: the rotating speed of the engine is lower than a predetermined speed; the atmospheric pressure is lower than a predetermined pressure and the temperature of the coolant is lower than a predetermined temperature, the first state of said second operating state being that wherein: the rotating speed of the engine is higher than said predetermined speed and the load of the engine is lower than a predetermined load; the atmospheric pressure is lower than said predetermined pressure; and the temperature of the coolant is lower than said predetermined temperature, and the second part of said second operating state being that wherein: the load of the engine is higher than said predetermined load and the rotating speed of the engine is higher than said predetermined speed; the atmospheric pressure is lower than said predetermined pressure; and the temperature of the coolant is lower than said predetermined temperature.

16. A diesel engine according to claim 13, wherein said first operating state is that wherein: the load of the engine is higher than a predetermined first load and the rotating speed of the engine is lower than a predetermined speed, or the load of the engine is lower than a predetermined second load which is lower than said first load; the atmospheric pressure is lower than a predetermined pressure; and the temperature of the coolant is higher than a predetermined temperature, the first part of said second operating state being that wherein: the load of the engine is a load between said first load and said second load; the atmospheric pressure is lower than said predetermined pressure; and the temperature of the coolant is higher than said predetermined temperature, and the second part of said second operating state being that wherein: the load of the engine is higher than said predetermined load; the rotating speed of the engine is higher than said predetermined speed; the atmospheric pressure is lower than said predetermined pressure; and the temperature of the coolant is higher than said predetermined temperature.

17. A diesel engine according to claim 1, wherein said bypass passage comprises a first bypass passage bypassing said mechanically driven charger, and a second bypass passage connected to said turbocharger, said valve means comprising a first bypass valve for controlling a bypass air flow flowing within said first bypass passage, and a second bypass valve for controlling a bypass air flow flowing within said second bypass passage, said second operating state comprising a first part and a second part, said first bypass valve and said second bypass valve being closed when the engine is started or when the engine is operating in said first operating state, said first bypass valve being open and said second bypass valve being closed when the engine is operating in the first part of said second operating state, said first bypass valve being closed and said second bypass valve being open when the engine is operating in the second part of said second operating state.

18. A diesel engine according to claim 17, wherein said first bypass valve shuts off an inflow air into said mechanically driven charger when said first bypass valve opens said first bypass passage, and said first bypass valve allows an inflow of air into said mechanically driven charger when said first bypass valve shuts off said first bypass passage.

19. A diesel engine according to claim 17, wherein said second detecting means comprises an engine speed detector for detecting the rotating speed of the engine, and an engine load detector for detecting the load of the engine, said control means controlling said first bypass valve and said second bypass valve in response to output signals from said engine speed detector and said engine load detector to: close said first bypass valve and said second bypass valve when the engine is operating in said first operating state,; open said first bypass valve and close said second bypass valve when the engine is operating in the first part of said second operating state; and close said first bypass valve and open said second bypass valve when the engine is operating in the second part of said second operating state.

20. A diesel engine according to claim 19, wherein said first operating state is that wherein the load of the engine is higher than said predetermined load and the rotating speed of the engine is lower than a predetermined speed, the first part of said second operating state being that wherein the load of the engine is lower than said predetermined load, and the second part of said second operating state being that wherein the load of the engine is higher than said predetermined load and the rotating speed of the engine is higher than said predetermined speed.

21. A diesel engine according to claim 17, wherein said second detecting means comprises an engine speed detector for detecting the rotating speed of the engine, an engine load detector for detecting the load of the engine, a temperature detector for detecting the temperature of the coolant of the engine, and an atmospheric pressure detector for detecting the atmospheric pressure, said control means controlling said first bypass valve and said second bypass valve in response to output signals from said engine speed detector and said engine load detector to: close said first bypass valve and said second bypass valve when the engine is operating in said first operating state; open said first bypass valve and close said second bypass valve when the engine is operating in the first part of said second operating state; and close said first bypass valve and open said second bypass valve when the engine is operating in the second part of said second operating state.

22. A diesel engine according to claim 21, wherein said first operating state is that wherein: the load of the engine is higher than a predetermined load; the rotating speed of the engine is lower than a predetermined speed, and the atmospheric pressure is higher than a predetermined pressure, the first part of said second operating speed being that wherein the load of the engine is lower than said predetermined load and the atmospheric pressure is higher than said predetermined pressure, and the second part of said second operating state being that wherein the load of the engine is higher than said predetermined load; the rotating speed of the engine is higher than said predetermined speed; and the atmospheric pressure is higher than said predetermined pressure.

23. A diesel engine according to claim 21, wherein said first operating state is that wherein: the rotating speed of the engine is lower than a predetermined speed; the atmospheric pressure is lower than a predetermined pressure and the temperature of the coolant is lower than a predetermined temperature, the first state of said second operating state being that wherein the rotating speed of the engine is higher than said predetermined speed and of the load of the engine is lower than a predetermined load; the atmospheric pressure is lower than said predetermined pressure; and the temperature of the coolant is lower than said predetermined temperature, and the second part of said second operating state being that wherein: the load of the engine is higher than said predetermined load and the rotating speed of the engine is higher than said predetermined speed; the atmospheric pressure is lower than said predetermined pressure; and the temperature of the coolant is lower than said predetermined temperature.

24. A diesel engine according to claim 21, wherein said first operating state is that wherein: the load of the engine is higher than a predetermined first load and the rotating speed of the engine is lower than a predetermined speed, or the load of the engine is lower than a predetermined second load which is lower than said first load; the atmospheric pressure is lower than a predetermined pressure; and the temperature of the coolant is higher than a predetermined temperature, the first part of said second operating state being that wherein: the load of the engine is a load between said first load and said second load; the atmospheric pressure is lower than said predetermined pressure; and the temperature of the coolant is higher than said predetermined temperature, and the second part of said second operating state being that wherein: the load of the engine is higher than said predetermined load; the rotating speed of the engine is higher than said predetermined speed; the atmospheric pressure is lower than said predetermined pressure; and the temperature of the coolant is higher than said predetermined temperature.

25. A diesel engine according to claim 1, wherein said first detecting means detects the operation of a starter switch.

26. A diesel engine according to claim 25, wherein said control means continues to connect said mechanically driven charger to the engine and shut off said bypass air flow for a predetermined time after said starter switch is made OFF.

27. A diesel engine according to claim 26, wherein said second detecting means comprises a temperature detector for detecting the temperature of the coolant of the engine, said predetermined time being lengthened as the temperature of the coolant drops.

28. A diesel engine according to claim 1, wherein said engine has a compression ratio of about 16:1 through 18:1.

* * * * *